US008452061B2

(12) United States Patent
Liang et al.

(10) Patent No.: US 8,452,061 B2
(45) Date of Patent: May 28, 2013

(54) ELECTRONIC COLON CLEANSING METHOD FOR VIRTUAL COLONOSCOPY

(75) Inventors: Jerome Z. Liang, Stony Brook, NY (US); Zigang Wang, Knoxville, TN (US)

(73) Assignee: The Research Foundation of State University of New York, New York, NY (US)

( * ) Notice: Subject to any disclaimer, the term of this patent is extended or adjusted under 35 U.S.C. 154(b) by 689 days.

(21) Appl. No.: 12/095,645

(22) PCT Filed: Nov. 29, 2006

(86) PCT No.: PCT/US2006/046169
§ 371 (c)(1),
(2), (4) Date: May 10, 2010

(87) PCT Pub. No.: WO2007/064980
PCT Pub. Date: Jun. 7, 2007

(65) Prior Publication Data
US 2010/0208956 A1    Aug. 19, 2010

Related U.S. Application Data

(60) Provisional application No. 60/741,494, filed on Nov. 30, 2005.

(51) Int. Cl.
*G06K 9/00* (2006.01)
(52) U.S. Cl.
USPC ............................................. 382/128; 382/224
(58) Field of Classification Search
USPC .......... 382/128–134, 154, 173, 224; 345/589, 345/664–665; 434/262, 267, 272
See application file for complete search history.

(56) References Cited

U.S. PATENT DOCUMENTS

| 4,367,216 A | 1/1983 | Mutzel et al. |
| 4,391,280 A | 7/1983 | Miller |

(Continued)

FOREIGN PATENT DOCUMENTS

| WO | 9613207 | 5/1996 |
| WO | 9811524 | 3/1998 |

(Continued)

OTHER PUBLICATIONS

Hong et al., "3D Virtual Colonoscopy," 1995 Biomedical Visualization Proceedings, pp. 26-32 and 83 (1995).

(Continued)

*Primary Examiner* — Kanjibhai Patel
(74) *Attorney, Agent, or Firm* — Dorsey & Whitney LLP (57) ABSTRACT

A method for electronically cleansing a virtual object formed from acquired image data converted to a plurality of volume elements is provided. The present method allows individual volume elements, or voxels, to represent more than one material type. The method includes defining a partial volume image model for volume elements representing a plurality of material types based, at least in part, on the measured intensity value of the volume element. The material mixture for each of the volume elements representing a plurality of material types can be estimated using the observed intensity values and the defined partial volume image model. The volume elements representing a plurality of material types can then be classified in accordance with the estimated material mixture. For electronic colon cleansing, the method includes removing at least one classification of volume elements when displaying the virtual object.

17 Claims, 8 Drawing Sheets

U.S. PATENT DOCUMENTS

| | | | |
|---|---|---|---|
| 4,630,203 | A | 12/1986 | Szirtes |
| 4,710,876 | A | 12/1987 | Cline et al. |
| 4,719,585 | A | 1/1988 | Cline et al. |
| 4,729,098 | A | 3/1988 | Cline et al. |
| 4,737,921 | A | 4/1988 | Goldwasser et al. |
| 4,751,643 | A | 6/1988 | Lorensen et al. |
| 4,791,567 | A | 12/1988 | Cline et al. |
| 4,823,129 | A | 4/1989 | Nelson |
| 4,831,528 | A | 5/1989 | Crawford et al. |
| 4,874,362 | A | 10/1989 | Wiest et al. |
| 4,879,668 | A | 11/1989 | Cline et al. |
| 4,984,157 | A | 1/1991 | Cline et al. |
| 4,985,834 | A | 1/1991 | Cline et al. |
| 4,985,856 | A | 1/1991 | Kaufman |
| 4,987,554 | A | 1/1991 | Kaufman |
| 4,993,415 | A | 2/1991 | Long |
| 5,006,109 | A | 4/1991 | Douglas et al. |
| 5,023,072 | A | 6/1991 | Cheng |
| 5,038,302 | A | 8/1991 | Kaufman |
| 5,047,772 | A | 9/1991 | Ribner |
| 5,056,020 | A | 10/1991 | Feldman et al. |
| 5,095,521 | A | 3/1992 | Trousset et al. |
| 5,101,475 | A | 3/1992 | Kaufman |
| 5,127,037 | A | 6/1992 | Bynum |
| 5,166,876 | A | 11/1992 | Cline et al. |
| 5,170,347 | A | 12/1992 | Tuy et al. |
| 5,187,658 | A | 2/1993 | Cline et al. |
| 5,204,625 | A | 4/1993 | Cline et al. |
| 5,229,935 | A | 7/1993 | Yamagishi et al. |
| 5,245,538 | A | 9/1993 | Lis |
| 5,261,404 | A | 11/1993 | Mick et al. |
| 5,265,012 | A | 11/1993 | Amans et al. |
| 5,270,926 | A | 12/1993 | Tam |
| 5,283,837 | A | 2/1994 | Wood |
| 5,295,488 | A | 3/1994 | Lloyd et al. |
| 5,299,288 | A | 3/1994 | Glassman et al. |
| 5,319,549 | A | 6/1994 | Katsuragawa et al. |
| 5,322,070 | A | 6/1994 | Goodman et al. |
| 5,345,490 | A | 9/1994 | Finnigan et al. |
| 5,361,763 | A | 11/1994 | Kao et al. |
| 5,365,927 | A | 11/1994 | Roemer et al. |
| 5,371,778 | A | 12/1994 | Yanof et al. |
| 5,442,733 | A | 8/1995 | Kaufman et al. |
| 5,458,111 | A | 10/1995 | Coin |
| 5,611,025 | A | 3/1997 | Lorensen et al. |
| 5,623,586 | A | 4/1997 | Höhne |
| 5,630,034 | A | 5/1997 | Oikawa et al. |
| 5,699,799 | A | 12/1997 | Xu et al. |
| 5,734,384 | A | 3/1998 | Yanof et al. |
| 5,782,762 | A | 7/1998 | Vining |
| 5,920,319 | A | 7/1999 | Vining et al. |
| 5,971,767 | A | 10/1999 | Kaufman |
| 5,986,662 | A | 11/1999 | Argiro et al. |
| 6,125,194 | A | 9/2000 | Yeh et al. |
| 6,130,671 | A | 10/2000 | Argiro |
| 6,219,059 | B1 | 4/2001 | Argiro |
| 6,272,366 | B1 | 8/2001 | Vining |
| 6,331,116 | B1 * | 12/2001 | Kaufman et al. ............. 434/262 |
| 6,343,936 | B1 * | 2/2002 | Kaufman et al. ............. 434/262 |
| 6,514,082 | B2 | 2/2003 | Kaufman et al. |
| 7,148,887 | B2 * | 12/2006 | Kaufman et al. ............. 345/419 |
| 7,194,117 | B2 * | 3/2007 | Kaufman et al. ............. 382/128 |
| 7,324,104 | B1 | 1/2008 | Bitter et al. |
| 7,449,202 | B1 * | 11/2008 | Chou ............................ 424/725 |
| 7,706,600 | B2 * | 4/2010 | Kreeger et al. ............... 382/154 |
| 2001/0055016 | A1 | 12/2001 | Krishnar |
| 2002/0164061 | A1 | 11/2002 | Paik et al. |
| 2003/0208116 | A1 | 11/2003 | Liang et al. |
| 2004/0015070 | A1 | 1/2004 | Liang et al. |
| 2004/0109603 | A1 | 6/2004 | Kaufman et al. |
| 2005/0152588 | A1 | 7/2005 | Yoshida et al. |
| 2005/0152591 | A1 | 7/2005 | Kiraly et al. |
| 2005/0245803 | A1 | 11/2005 | Glenn et al. |
| 2007/0003131 | A1 | 1/2007 | Kaufman et al. |
| 2007/0103464 | A1 | 5/2007 | Kaufman et al. |

FOREIGN PATENT DOCUMENTS

| | | |
|---|---|---|
| WO | 9837517 | 8/1998 |
| WO | 0055812 | 9/2000 |
| WO | 0055814 | 9/2000 |

OTHER PUBLICATIONS

Hong et al., "3D Reconstruction and Visualization of the Inner Surface of the Colon from Spiral CT Data," IEEE, pp. 1506-1510 (1997).

William E. Lorensen, "The Exploration of Cross-Sectional Data with a Virtual Endoscope," Interactive Technology and the New Health Paradigm, IOS Press, pp. 221-230 (1995).

Adam L. Penenberg, "From Stony Brook, a New Way to Examine Colons, Externally," The New York Times, p. 6 (1996).

David J. Vining, "Virtual Colonoscopy," Advance for Administrators in Radiology, pp. 50-52 (1998).

Zhou et al., "Three-Dimensional Skeleton and Centerline Generation Based on an Approximate Minimum Distance Field," The Visual Computer, 14:303-314 (1998).

Liang Z et al., "Inclusion of a priori information in segmentation of colon lumen for 3D virtual colonscopy", 1997 IEEE Nuclear Science Symposium Conference Record, pp. 1423-1427, vol. 2.

Valev et al., "Techniques of CT colongraphy (virtual colonoscopy)", Critical Reviews in Biomedical Engineering, 1999, Begall House, vol. 27, No. 1-2, pp. 1-25.

Shibolet O et al., "Coloring voxel-based objects for virtual endoscopy", IEEE Symposium on Volume Visualization, Research Triangle, Oct. 1998.

Kaufman A., Wan M., "Disobstruction of Colon Wall Collapse", Project Description, online www.cs.sunysb.edu, Jan. 1999.

Holzapfel G A, et al., "Large strain analysis of soft biological membranes: formulation and finite element analysis", Computer Methods in Applied Mechanics and Engineering, vol. 132, No. 1-2, pp. 45-61, 1996.

Kaye J. et al., "A 3D virtual environment for modeling mechanical cardiopulmonary interactings", CVRMED-MRCAS '97, pp. 389-398, 1997.

Burgard W. et al., "Active mobile robot localization by entrophy minimization", Proceedings second euromicro workshop on advanced mobile robots, pp. 155-162, 1997.

Suya You et al., "Interactive volume rendering for virtual colonoscopy", Proceedings Visualization '97, pp. 433-436, 571.

Pai D.K. et al., "Multiresolution Rough Terrain Motion Planning", IEEE Transactions on Robotics and Automatic, vol. 14, No. 1, pp. 19-33, 1998.

Hagen H. et al., "Methods for Surface Interrogation", Proceedings of the Conference on Visualization, vol. CONF 1, pp. 187-193, 1990.

Liang Z. et al., "Feasibility Studies on Extracting Bladder Wall from MR Images for Virtual Cystoscopy".

Chen et al., "Virtual Laryngoscopy: Feasibility Studies by CT and MRI", IEEE Medical Imaging Conference, Nov. 1999.

Chen et al., A multi-scan MRI-based virtual cystoscopy.

Chen et al., "MRI-Based Virtual Cystoscopy: The image segmentation and visualization", SPIE Conference, Feb. 12-18, 2000.

Chen et al., "A Fast Algorithm to Generate Centerline for Virtual Colonoscopy", SPIE Conference, Feb. 12-18, 2000.

Richard Robb, "Virtual (Computed) Endoscopy: Development and Evaluation Using the Visible Human Datasets", Oct. 7-8, 1996. www.mayo.edu.

I. Bitter et al., "Penallized-Distance Volumetric Skeleton Algorithm", IEEE Transactions on Visualization and Computer Graphics, vol. 7, No. 3, Jul.-Sep. 2001, pp. 195-206.

M. Wan et al., "Distance-Field Based Skeletons for Virtual Navigation", *Visualization 2001*, San Diego, CA, Oct. 2001.

M. Sato et al., "An automatic colon segmentation for 3D virtual colonoscopy", IEICE Trans. Information and Systems, vol. E84-D, No. 1, Jan. 2001, pp. 201-208.

D. Chen et al., "A Novel Approach to Extract Colon Lumen from CT Images for Virtual Colonoscopy" IEEE Transactions on Medical Imaging, vol. 19, No. 12, Dec. 2000, pp. 1220-1226.

M. Wax et al., "Virtual Colonoscopy—CT Contrast Agent", Second International Symposium on Virtual Colonoscopy, Boston, MA, Oct. 2000.

K. Kreeger, et al., "Volume Rendering for Virtual Colonoscopy on an Affordable PC", Second International Symposium on Virtual Colonoscopy, Boston, MA, Oct. 2000.

S. Lakare et al., "3D Digital Cleansing Using Segmentation Rays", IEEE Visualization 2000 Conference Proceedings, AcCM/SIG-GRAPH Press, pp. 37-44, Oct. 2000.

S. Lakare et al., "Automated Pre-navigation processing for Virtual Colonoscopy", Second International Symposium on Virtual Colonoscopy, pp., Oct. 2000.

K. Kreeger et al., (2000) "Perspective Virtual Endoscopy with VolumePro Parallel Rendering", Center for Visual Computing and Department of Computer Science, pp. 1-8.

D. Chen et al. "A tree-branch searching, multi-resolution approach to skeletonization for virtual endoscopy", SPIE Medical Imaging 2000, Feb. 2000.

Wan et al., "3D Virtual Colonoscopy with Real-time Volume Rendering", SPIE Medical Imaging 2000, Feb. 2000.

M. Wax et al., "Advancing Virtual Colonoscopy to Practice", International Workshop on 3D Imaging and Virtual Endoscopy, Feb. 2000.

W. Li et al., (1999) "Virtual Colonoscopy Powered by Volume Pro", pp. 1-13.

M. Wan et al., "Volume Rendering Based Interactive Navigation within the Human Colon", IEEE Visualization '99 conference, San Francisco, CA, Oct. 1999, pp. 397-400.

R. Chiou et al., "Interactive Fly-Path Planning Using Potential Fields and Cell Decomposition for Virtual Endoscopy", IEEE Trans. Nuclear Sciences, vol. 46, No. 4, Aug. 1999, pp. 1045-1049.

D. Chen et al., (1999) "MR Imaging and Segmentation of the Colon Wall for Virtual Colonscopy", Soc. Magn. Reson. Medicine, vol. 3, pp. 2203.

R. Chiou et al., "Volume Segmentation and Rendering of Mixtures of Materials for Virtual Colonoscopy", SPIE Medical Imaging '99, Feb. 1999, pp. 133-138.

Z. Liang et al., "On Segmentation of Colon Lumen for Virtual Colonoscopy", SPIE Medical Imaging, Feb. 1999, pp. 270-278.

Z. Liang et al., "Virtual Endoscopy in Early Detection of Cancers", Biomedical Imaging Symposium: Visualizing the Future of Biology and Medicine, Washington, D.C., Feb. 1999.

R. Chiou et al, "Unified Analysis, Modeling, Matching and Synthesis for CT Color Texture Mapping from the Visible Human Dataset", The Second Visible Human Project Conf., Bethesda, MD, Oct.

M. Wan et al., "Boundary Cell-Based Acceleration for Volume Ray Casting", Computer & Graphices, vol. 22, No. 6, 1998, pp. 715-721.

R. Chiou et al., "Interactive Path Planning for Virtual Endoscopy", Conf. Record IEEE NSS-MIC, Nov. 1998.

M. Wax et al., "Electronic Colon Cleansing for Virtual Colonoscopy", Presentation at the first Int'l. Conf. on Virtual Colonoscopy, Boston, MA, Oct. 1998.

L. Hong et al., "Virtual Voyage: Interactive Navigation in the Human Colon", Proc. ACM SIGGRAPH '97, Aug. 1997, pp. 27-34.

A. Viswambharan et al., "Virtual Colonoscopy: Three-dimensional Reconstruction of the Mucosal Surface of the Colon", Conf. of Radiological Society of North America (RSNA), Dec. 1996, pp. 565.

L. Hong et al., "Physcially-Based Interactive Navigation", Technical Report TR.96.01.09, Computer Science.

L. Hong et al., "Visible Human Virtual Colonoscopy", Conference of National Library of Medicine Visible Human Project, Oct. 1996, pp. 29-30.

$80^{th}$ Scientific Assembly and Annual Meeting Nov. 27-Dec. 2, 1994, Radiology Society of North America Founded in, InfoRAD Exhibits.

Taosong He, et al. "Collision Detection for Volumetric Objects", Proceedings of the $8^{th}$ IEEE Visualization Conference, 1997 1070-2385/97.

Yaoping Wang et al., "Real-Time Interactive Simulator for Percutaneous Coronary Revascularization Procedures", Computer Aided Surgery, 3:211-227, 1998.

Liang Z. et al,, (1999) "Feasibility Studies on Extracting Bladder Wall from MR Images for Virtual Cystoscopy".

Wang et al., "Speedup OS-EM Image Reconstruction by PC Graphics Card Techologies for Quantitatice SPECT with Varying Focal-Length Fan-Beam Collimation" IEEE Transactions on Nuclear Science, vol. 52, No. 5, Oct. 2005**.

International Search Report and Written Opinion for International Application No. PCT/US2006/061368 dated Nov. 30, 2006.

International Written Opinion for International Application No. PCT/US06/46169 mailed on Jun. 13, 2008.

* cited by examiner

| Index | Tissue types |
|---|---|
| 1 | Air only |
| 2 | Tissue only |
| 3 | Muscle only |
| 4 | Bone only |
| 5 | Air and tissue |
| 6 | Air and muscle |
| 7 | Air and bone |
| 8 | Tissue and muscle |
| 9 | Tissue and bone |
| 10 | Muscle and bone |
| 11 | Air, tissue and muscle |
| 12 | Air, tissue and bone |
| 13 | Air, muscle and bone |
| 14 | Tissue, muscle and bone |
| 15 | Air, tissue, muscle and bone |

FIG. 7: A total of 15 possible tissue mixtures for four tissue types in a CT image.

FIG. 8

ELECTRONIC COLON CLEANSING METHOD FOR VIRTUAL COLONOSCOPY

STATEMENT OF PRIORITY AND RELATED APPLICATIONS

This application claims priority to U.S. Provisional Application 60/741,494 filed on Nov. 30, 2005, entitled An Improved Electronic Colon Cleansing Method for Detection of Colonic Polyps by Virtual Colonoscopy, the disclosure of which is hereby incorporated by reference in its entirety.

STATEMENT OF GOVERNMENT RIGHTS

This invention was made with government support under grant number CA082402 awarded by the National Cancer Institute. The government has certain rights in the invention.

BACKGROUND OF THE INVENTION

Colorectal cancer is a leading cause of cancer-related deaths in the United States. More than 90% of colon cancers develop from adenomatous polyps, removal of which can dramatically reduce the risk of death. Accepted guidelines recommend the screening of adults who are at average risk for colorectal cancer, since the detection and removal of adenomas has been shown to reduce the incidence of cancer and cancer-related mortality. Currently available detection methods include fecal occult blood tests, sigmoidoscopy, barium enemas, and fiber optic colonoscopies (OC). Unfortunately, most people do not follow this advice because of the discomfort and inconvenience of the traditional optical colonoscopy. To encourage people to participate in screening programs, virtual colonoscopy (VC), also known as computed tomographic colonography (CTC), has been proposed and developed to detect colorectal neoplasms by using a computed tomography (CT) or magnetic resonance imaging (MRI) scan. VC is minimally invasive and does not require sedation or the insertion of a colonoscope. Compared to OC, VC has the potential to become a common screening method in terms of safety, cost, and patient compliance. VC exploits computers to reconstruct a 3D model of the CT scans taken of the patient's abdomen, and creates a virtual fly-through of the colon to help radiologists navigate the model and create an accurate, efficient diagnosis. Previously known systems and methods for performing virtual colonoscopy are described, for example, in U.S. Pat. Nos. 5,971,767, 6,331,116 and 6,514,082, the disclosures of which are incorporated by reference in their entireties.

It has been demonstrated that the performance of VC can compare favorably with that of traditional OC. As is required with traditional optical colonoscopies, the colon needs a thorough cleansing before the VC and computer aided detection (CAD) of polyps. However, even with a rigorous cleansing of the colon, remaining stool and fluid residues may mimic polyps, thereby dramatically reducing the efficiency of the VC and CAD.

Electronic colon cleansing (ECC) may be used to improve the efficiency of VC and CAD by effectively removing colonic material from the acquired images. Preparing the colon for ECC varies slightly from traditional VC and CAD without ECC. A preliminary step of ECC is tagging the colonic material with a contrast agent. With the addition of a contrast agent, the tagged stool and fluid have an enhanced image density compared to the density of the colon/polyp tissues. By segmenting the colon images and recognizing patterns, ECC methods can be used to identify the enhanced colonic material and produce a "clean" colon model for both VC navigation and CAD analysis. A known ECC approach is to apply simple thresholds to the image data for segmentation and then removing certain tagged material. However, the effectiveness of the threshold approach to ECC may be impaired by a partial volume (PV) effect at various boundary regions, such as the air-colonic material interface and the colon/polyp tissue-colonic material interface.

Various approaches to mitigate the PV effect have been explored in the art. For example, a ray-based detection technique exists, which utilizes a predefined profiled pattern to detect interfaces. Other techniques use morphological and linear filters, image gradient information, and a priori models to mitigate the PV effect. Each of the previous methods relies on the assumption that limited information may be derived from an image voxel, which limits the effectiveness of the solution. As a result, improved techniques for addressing the PV effect are desired. An improvement is particularly important in CAD of polyps because the mucosa region of the colon, in which polyps often reside, is a boundary region which is often obscured by the PV effect. Thus, it is an object of the present method to provide an improved electronic cleansing process and, in particular, to provide an electronic cleansing process which results in a clean mucosa layer well-suited for CAD techniques.

SUMMARY OF THE INVENTION

In accordance with the present invention, a method for electronically cleansing a virtual object formed from acquired image data converted to a plurality of volume elements is provided. The present method allows individual volume elements, or voxels, to represent more than one material type. The method includes defining a partial volume image model for volume elements representing a plurality of material types based, at least in part, on the measured intensity value of the volume element. The material mixture for each of the volume elements representing a plurality of material types can be estimated using the observed intensity values and the defined partial volume image model. The volume elements representing a plurality of material types can then be classified in accordance with the estimated material mixture. For electronic colon cleansing, the method includes removing at least one classification of volume elements when displaying the virtual object.

DETAILED DESCRIPTION OF PREFERRED EMBODIMENTS

Figure 1:
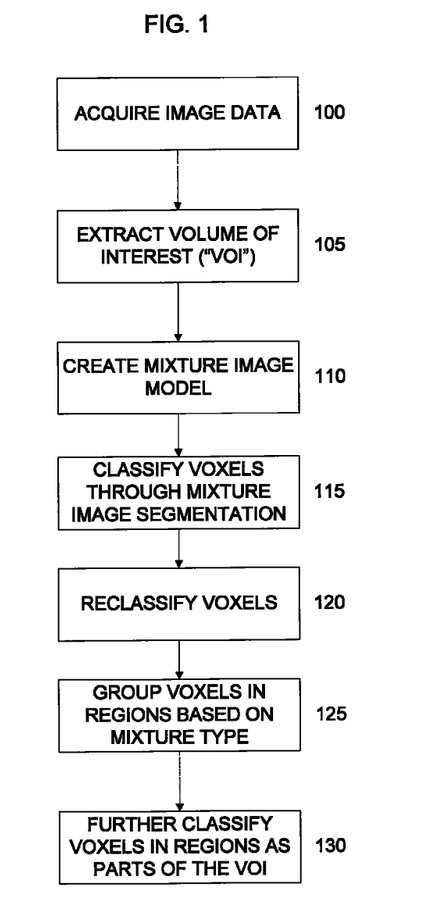
FIG. 1 is a simplified flow chart illustrating the steps in one exemplary embodiment of the present method of electronic colon cleansing.
Figure 4A:
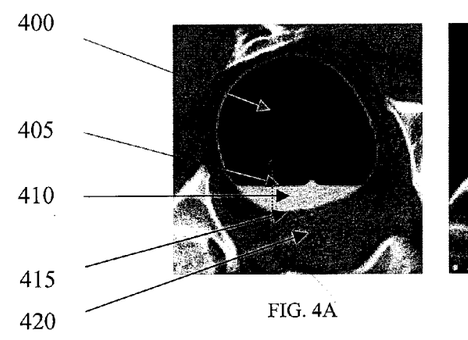
FIG. 4A is an exemplary CT image slice of the colon, illustrating a layer of enhanced colonic materials. The dotted vertical line indicates a sample path for the density profile of FIG. 4C.

An overview of the present method is illustrated by reference to the simplified flow chart in FIG. 1. An exemplary embodiment of the present invention assumes that, after proper bowel preparation, appropriate 2D image data has been acquired, such as through the use of a spiral CT scan, MRI scan, or other suitable method known in the art of virtual colonoscopy (step 100). From the 2D image data, the volume of interest (VOI), such as the colon tissue volume, is extracted in a manner generally known in the art (step 105). For example, a sliced spiral CT scanner can be used with clinically available protocols to cover the entire abdominal volume during a single breath hold. Suitable detector collimation can be 5 mm and the images can be reconstructed as 1 mm thick slices of 512×512 array size. An example of a CT image slice is illustrated in FIG. 4A. The exemplary 2D image in FIG. 4A has five distinct areas: air (400), an interface layer (405), colonic material (410), a mucosa layer (415), and colon tissue/bone (420). The present methods operate to classify the voxels in a region of interest, such as the colon, using a mixture-based image segmentation algorithm and to remove or reclassify the classification of colonic materials for a clean colon lumen and mucosa layer, resulting in the "cleansed" image in FIG. 6C.

Returning to FIG. 1, in step 110, the density values of each voxel are used to create a mixture image model, also represented herein as a PV image model. Further, in step 115, the mixture image model is used in a PV segmentation algorithm, described in further detail below, to initially classify the various voxels of the acquired colon image. In step 120, to address any misclassified voxels, the classified voxels are reclassified through a series of dilation and erosion operations in a manner generally known in the art, which are described in further detail below. Depending on a voxel's reclassification, in step 125, the voxel may be grouped in different regions of similar density value. In step 130, depending on its region, a voxel's density value can be altered, described in further detail below, to further classify the individual voxels as part of the volume of interest and subsequently restored. Further in step 130, voxels grouped in some boundary regions are subjected to an iterative segmentation algorithm, described in further detail below, to further classify the voxels as part of the volume of interest.

Turning to steps 110 and 115, prior to the virtual colon cleansing, the image voxels can be initially classified as containing one or more materials by using a mixture image segmentation algorithm, also known as a PV image segmentation algorithm. Mixture image segmentation operates to determine the material mixtures and the material model parameters from the acquired image data, which include observed density or intensity values. To achieve the goals of mixture image segmentation, the observed density or intensity values must relate in some way to the material mixtures and the material model parameters. The mixture image model in step 110 is used to establish the relationship between the measured intensity values and the mixture properties of each voxel so that there may be effective mixture image segmentation in step 115.

Figure 2:
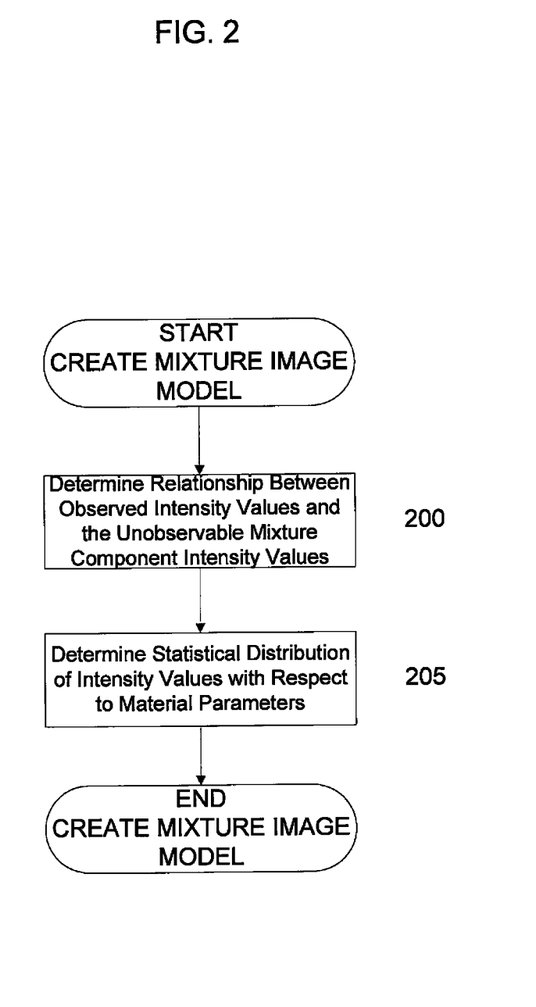
FIG. 2 is a simplified flow chart further representing the process of developing a PV or mixture image model, suitable for use with the present method.

FIG. 2 is a flow chart further illustrating the steps of creating a mixture image model. First, in step 200, a relationship is established between what is observed, the measured intensity values for each voxel, and what is not observed, the density contribution of each material represented by a voxel. In the present exemplary embodiment, the acquired image density distribution Y can be represented by a column vector $[y_1, y_2, \ldots, y_N]^T$, where the observed density of an individual voxel i is $y_i$ and N is the total number of voxels in the image. If the acquired image density $\{y_i\}$ may possibly contain K material types within each voxel i, then there may be a possibility of K tissue types, where each material type k has a contribution $x_{ik}$ to the observed density value $y_i$ for an individual voxel i. Therefore, the observed density value $y_i$ can be represented by the relationship $$y_i = \sum_{k=1}^{K} x_{ik}.$$

The expression states that the sum of K density contributing elements $x_{ik}$, for a particular voxel i, constitutes the observed density $y_i$ for a particular voxel i.

If there are multiple material types in at least some of the voxels, then a statistical determination of each material type's contribution to the individual voxel's intensity value is performed (step 205). Under the present exemplary embodiment, the unobservable density contributing element $x_{ik}$ is expected to follow a Gaussian statistical distribution with mean $\mu_{ik}$ and variance $\sigma_{ik}^2$ Voxel i may be fully filled by material type k; in which case $x_{ik}$ may become the observable variable $y_i$ in the present exemplary embodiment. If, however, voxel i is partially filled by material type k, then $m_{ik}$ may be the fraction of material type k inside voxel i. When there is a possibility of multiple material types, the resulting relationship can be expressed by $$\mu_{ik} \stackrel{def}{=} m_{ik}\mu_k \text{ and } \sigma_{ik}^2 \stackrel{def}{=} m_{ik}\sigma_k^2,$$

$$\text{where } \sum_{k=1}^{K} m_{ik} = 1, 0 \leq m_{ik} \leq 1 \text{ and } (\mu_k, \sigma_k^2, \mu_{ik}, \sigma_{ik}^2) \geq 0.$$

The image density $y_i$ at voxel i can be expressed as $$y_i = \rho_i \sum_{k=1}^{K} m_{ik}\mu_k + \varepsilon_i$$

which follows a Gaussian distribution, where $\varepsilon_i$ is Gaussian noise associated with $y_i$ at voxel i with a mean of zero and a variance expressed as $$\sigma_{y_i}^2 = \sum_{k=1}^{K} \sigma_{ik}^2 = \sum_{k=1}^{K} m_{ik}\sigma_k^2.$$

Notation $\rho_i$ reflects the bias field or inhomogeneity effect at voxel i which is a result of a non-uniform RF field across the body and tissue response to the local magnetic field. In a non-MRI scan, however, the $\rho_i$ factor may be removed.

The probability distribution of sampling $\{y_i\}$, given the parameters $\{m_{ik}, \rho_i, \mu_k\sigma_k^2\}$, can be expressed as:

$$Pr(Y|M, \rho, \mu, \sigma) = \prod_{i=1}^{N} Pr(y_i|m_i, \rho, \mu, \sigma) \qquad (1)$$

$$= \prod_{i=1}^{N} \frac{1}{\sqrt{2\pi \sum_{k=1}^{K} m_{ik}\sigma_k^2}} \exp\left[-\frac{\left(y_i - \rho_i \sum_{k=1}^{K} m_{ik}\mu_k\right)^2}{2\sum_{k=1}^{K} m_{ik}\sigma_k^2}\right]$$

where $M=[m_1, m_2, \ldots, m_N]^T$, $m_i=[m_{i1}, m_{i2}, \ldots, m_{iK}]^T$, $\mu=[\mu_1, \mu_2, \ldots, \mu_K]^T$, and $\sigma_2=[\sigma_1^2, \sigma_2^2, \ldots, \sigma_K^2]^T$. The probability distribution of sampling $\{x_{ik}\}$, given the parameters $\{m_{ik}, \rho_i, \mu_k, \sigma_k^2\}$ can be expressed as:

$$Pr(X|m, \rho, \mu, \sigma) = \prod_{i,k=1}^{N,K} \frac{1}{\sqrt{2\pi m_{ik}\sigma_k^2}} \exp\left[-\frac{(x_{ik} - \rho_i m_{ik}\mu_k)^2}{2m_{ik}\sigma_k^2}\right] \qquad (2)$$

where $X=[x_1, x_2, \ldots, x_N]^T$ and $x_i=[x_{i1}, x_{i2}, \ldots, x_{iK}]^T$. Taken together, equations (1) and (2) represent a PV or mixture image model, which may be used in of mixture image segmentation in step 115 of FIG. 1.

The mixture image segmentation determines the composition of material mixtures $\{m_{ik}\}$, $$\left(\sum_{k=1}^{K} m_{ik} = 1 \text{ and } 0 \leq m_{ik} \leq 1\right),$$

and $0 \leq m_{ik} \leq 1$), and the material model parameters $\{\rho_i, \mu_k, \sigma_k^2\}$ from the acquired image data $\{y_i\}$. As described below, an expectation-maximization (EM) algorithm, which is generally known in the art, can be used to estimate the mixture parameters. The task of determining the mixture parameters $\{m_{ik}, \rho_i, \mu_k, \sigma_k^2\}$, given the acquired image data $\{y_i\}$, can be specified by an a posteriori probability, which first requires an a priori distribution of $\{m_{ik}\}$ and $\{\rho_i\}$.

In image processing applications, a Markov random field (MRF) a priori regularization can be use to determine a maximum a posteriori probability (MAP) solution. The MRF model for $\{m_{ik}\}$ can be expressed in the form:

$$Pr(m_i|N_i) = \frac{1}{Z}\exp\left(-\beta \sum_{k=1, j \in N_i}^{K} \alpha_{ij}(m_{ik} - m_{jk})^2\right) \qquad (3)$$

where $N_i$ denotes the neighborhood of voxel i, $\beta$ is a parameter controlling the degree of the penalty on the mixture M, $\alpha_{ij}$ is a scale factor reflecting the difference among various orders of the neighboring voxels, and Z is the normalization factor for the MRF model.

In the present exemplary embodiment, only the first-order neighborhood system is considered and $\alpha_{ij}$ is the same for the six first-order neighbors when the image has a uniform spatial resolution in three dimensions (e.g., $\alpha_{ij}=1$). When the axial resolution is two times lower than the transverse resolution, the $\alpha_{ij}$ for the two neighbors in the axial direction is two times smaller than the $\alpha_{ij}$ for the four neighbors in the transverse plane (e.g., $\alpha_{ij}=1$ in transverse plane and $\alpha_{ij}=0.5$ in axial direction).

A similar MRF can be specified for $\{\rho_i\}$ as:

$$Pr(\rho_i|N_i) = \frac{1}{Z}\exp\left[-\gamma_1 \sum_{j=1}^{R} (D_j * \rho)_i^2 - \gamma_2 \sum_{j,l=1}^{R} (D_j * D_l * \rho)_i^2\right] \qquad (4)$$

where R equals 2 for 2D slice images and 3 for 3D volume images. Notation D is the standard forward finite difference operator along the corresponding directions. The symbol * denotes the one dimensional discrete convolution operator. The first-order regularization term (associated with $\gamma_1$) penalizes a large variation in the bias field and the second-order regularization term (associated with $\gamma_2$) penalizes the discontinuities in the bias field $\{\rho_i\}$. Both parameters $\gamma_1$ and $\gamma_2$ play a similar role as $\beta$, in the MRF for $\{m_{ik}\}$, by controlling the degree of smoothness of the bias field. The conditional expectation in the EM algorithm, given the observed data $\{y_i\}$ and the estimate $\{M^{(n)}, \mu^{(n)}, \sigma^{2(n)}\}$ in the $n^{th}$ iteration, can be expressed by:

$$Q(M, \rho, \mu, \sigma | M^{(n)}, \rho^{(n)}, \mu^{(n)}, \sigma^{(n)}) = \qquad (5)$$

$$E[\ln Pr(X|M, \rho, \mu, \sigma) | Y, M^{(n)}, \rho^{(n)}, \mu^{(n)}, \sigma^{(n)}] =$$

-continued $$-1/2 \sum_{i=1,k=1}^{N,K} \left\{ \left[ \ln(2\pi m_{ik}\sigma_k^2) + \frac{1}{\omega_{ik}\sigma_k^2}(x_{ik}^{2(n)} - 2\rho_i m_{ik}\mu_k x_{ik}^{(n)} + \rho_i^2 m_{ik}^2 \mu_k^2) \right] + 2\beta \sum_{j \in N_i} \alpha_{ij}(m_{ik} - m_{jk})^2 + 2 \left[ \gamma_1 \sum_{j=1}^{R} (D_j * \rho)_i^2 + \right] \right\}$$

where the conditional means for $x_{ik}$ and $x_{ik}^2$ can be expressed by:

$$x_{ik}^{(n)} = E[x_{ik}|y_i, M^{(n)}, \mu^{(n)}, \sigma^{2(n)}] \quad (6)$$

$$= m_{ik}^{(n)}\mu_k^{(n)} + \frac{m_{ik}^{(n)}\sigma_k^{2(n)}}{\sum_{j=1}^{K} m_{ij}^{(n)}\sigma_j^{2(n)}} \cdot \left( y_i - \sum_{j=1}^{K} m_{ij}^{(n)}\mu_j^{(n)} \right)$$

$$x_{ik}^{2(n)} = E[x_{ik}^2|y_i, M^{(n)}, \mu^{(n)}, \sigma^{2(n)}] \quad (7)$$

$$= (x_{ik}^{(n)})^2 + m_{ik}^{(n)}\sigma_k^{2(n)} \frac{\sum_{j \neq k}^{K} m_{ij}^{(n)}\sigma_j^{2(n)}}{\sum_{j=1}^{K} m_{ij}^{(n)}\sigma_j^{2(n)}}.$$

The maximization in the EM algorithm determines the estimate in the $(n+1)^{th}$ iteration, which maximizes the conditional expectation of equation (5). For the mixture model parameter $\{\mu_k\}$, the differential is $$\partial Q(.)/\partial \mu_k \Big|_{\mu_k = \mu_k^{(n+1)}} = 0,$$

which leads to:

$$\mu_k^{(n+1)} = \frac{\sum_{i=1}^{N} x_{ik}^{(n)}}{\sum_{i=1}^{N} \rho_i^{(n)} m_{ik}^{(n)}} \quad (8)$$

For the other mixture model parameter $\{\sigma_k^2\}$, the relationship may be expressed by:

$$\sigma_k^{2(n+1)} = \frac{1}{N} \sum_{i=1}^{N} \frac{x_{ik}^{2(n)} - 2\rho_i^{(n)} m_{ik}^{(n)}\mu_k^{(n)} x_{ik}^{(n)} + \rho_i^{(n)} m_{ik}^{2(n)}\mu_k^{2(n)}}{m_{ik}^{(n)}}. \quad (9)$$

Maximizing the conditional expectation function $Q(.)$ with respect to the tissue mixture parameter $\{m_{ik}\}$, under the conditions of $$\sum_{k=1}^{K} m_{ik} = 1$$

and $0 \leq m_{ik} \leq 1$, does not generally have a closed-form solution like equations (6) and (7) have. When only a single acquired image $\{y_i\}$ is available, under the condition of $$\sum_{k=1}^{K} m_{ik} = 1,$$

the solution for the maximization of $Q(.)$, if it exists, limits voxel i to having a maximum of two tissue types. When noise is present in the image, additional constraints may be needed for a regularization solution. Adding the MRF to equation (5) causes the conditional expectation of the posteriori to have a quadratic form when the distribution is at the $n^{th}$ iteration and the variance $\sigma_{ik}^2 = m_{ik}\sigma_k^2$ is fixed for the $(n+1)^{th}$ iterated estimate. By maximizing the quadratic form $Q(.)+Pr(m_i|N_i)$ with respect to the material mixture parameter $\{m_{ik}\}$, under the conditions of $$\sum_{k=1}^{K} m_{ik} = 1$$

and $0 \leq m_{ik} \leq 1$, a closed-form solution can be derived. In the case where each voxel is limited to a maximum of two tissue types, i.e., $m_{i2}=1-m_{i1}$, the resultant relationship can be expressed as:

$$m_{i1}^{(n+1)} = \frac{x_{i1}^{(n)}\sigma_{i2}^{2(n)}\mu_1^{(n)} + \sigma_{i1}^{2(n)}\mu_2^{2(n)} - x_{i2}^{(n)}\sigma_{i1}^{2(n)}\mu_2^{(n)} + 4\beta\sigma_{i1}^{2(n)}\sigma_{i2}^{2(n)} \sum_{j \in N_i} \alpha_{ij}m_{j1}^{(n)}}{\mu_1^{2(n)}\sigma_{i2}^{2(n)} + \mu_2^{2(n)}\sigma_{i1}^{2(n)} + 4\beta\sigma_{i1}^{2(n)}\sigma_{i2}^{2(n)} \sum_{j \in N_i} \alpha_{ij}} \quad (10)$$

The bias field parameter $\{\rho_i\}$ can be expressed by:

$$\sum_{k=1}^{K} \frac{\mu_k^{(n)} x_{ik}^{(n)}}{\sigma_k^{2(n)}} = \rho_i \cdot \sum_{k=1}^{K} \frac{m_{ik}^{(n)}\mu_k^{2(n)}}{\sigma_k^{2(n)}} m_{ik}^{(n)}\mu_k^{2(n)} + \gamma_1(H_1 * \rho)_i + \gamma_2(H_2 * \rho)_i \quad (11)$$

where $$H_1 = \begin{bmatrix} 0 & -1 & 0 \\ -1 & 4 & -1 \\ 0 & -1 & 0 \end{bmatrix} \quad H_2 = \begin{bmatrix} 0 & 0 & 1 & 0 & 0 \\ 0 & 2 & -8 & 2 & 0 \\ 1 & -8 & 20 & -8 & 1 \\ 0 & 2 & -8 & 2 & 0 \\ 0 & 0 & 1 & 0 & 0 \end{bmatrix}.$$

Solving equation (11) for $\{\rho_i\}$ can be performed using equation (10).

Equations (8), (9), (10), and, if needed, (11) provide a MAP-EM solution for mixture image segmentation when the mixture in each voxel is resolved to a maximum of two material types per voxel.

Figure 3:
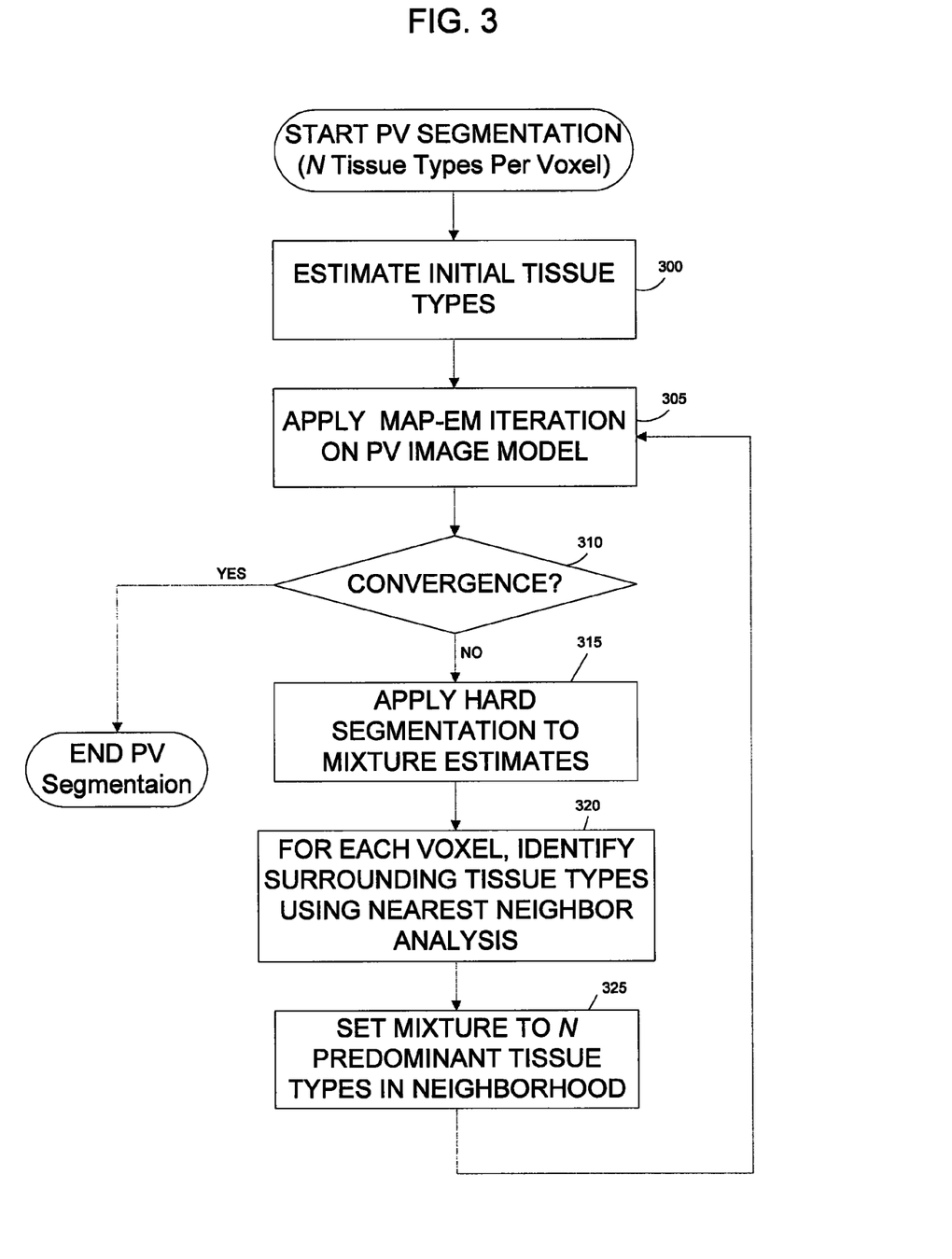
FIG. 3 is a simplified flow chart further illustrating an exemplary process of PV segmentation of the mixture image in accordance with the present method.

FIG. 3 is a simplified flow chart illustrating a PV segmentation process of step 120 using the MAP-EM solution of the PV image model derived above. Mixture image segmentation begins with an initial segmentation operation in step 305 involving a simple threshold operator, as known in the art, for hard segmentation. From the hard segmentation of step 300, each voxel is initially classified as one of four initial tissue types (air, soft tissue, muscle, and bone/TM) or model parameter sets $\{\mu_k^{(0)}, \sigma_k^{2(0)}\}$ using the labeled voxel density values. The initial tissue mixture $\{m_{ik}^{(0)}\}$ assumes that each voxel is 100% occupied by a single predominant tissue type. Applying the initial estimates of step 300, the MAP-EM solution set forth above in Equations 8-11 is then applied in step 305. The results of consecutive iterations of the MAP-EM solution are tested for convergence to an acceptable value in step 310. In one embodiment, convergance is assumed when the following termination criterion is satisfied:

$$\text{Max}\left(\left|\frac{\mu_k^{(n+1)}}{\mu_k^{(n)}} - 1\right|_{k=1,2}\right) < \gamma.$$

When the maximum difference between the means of each tissue class at the $n^{th}$ and the $(n+1)^{th}$ iterations is less than the specified threshold $\gamma$, the iteration process is terminated. In the present exemplary embodiment, $\gamma$ is set to be 0.05.

Figure 7:
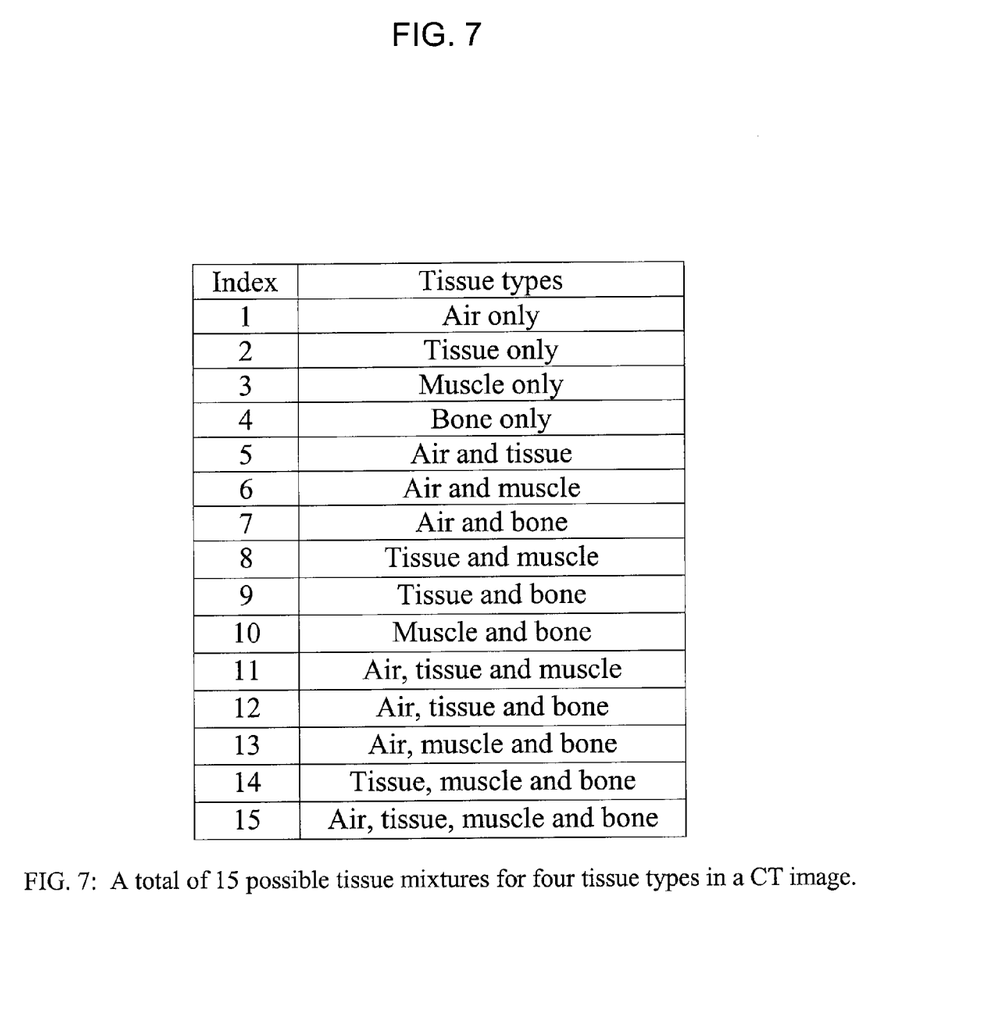
FIG. 7 is a table that shows the various material mixtures that might be present in a voxel when four material types are present in a CT image.

Since the MAP-EM solution of Equations (8) through (11) only provides a closed form solution for identifying two material types per voxel, and since there is no limitation on the number of material types in an entire image, an additional process is used to constrain the analysis to two material types between iterations of the MAP-EM solution of Step 305. In the present exemplary embodiment where the colon represents the volume of interest, the voxels of an image may be generally classified as containing four material types with different image densities, i.e., K=4: (i) air in the colon lumen and lungs, (ii) fat or soft tissues, (iii) muscle, and (iv) bone or tagged colonic materials. When there are four tissue types (the air, soft tissue, muscle, and bone/TM) expected to be present in an image, there are a total of 15 possible tissue mixtures, as shown in FIG. 7. This knowledge of the region of interest can be used to constrain the voxel mixture to a maximum of two components.

Steps 315 through 325, which are described below, can be used to limit each voxel to two material type mixtures which are compatible with the above described MAP-EM solution. In step 315, the mixture estimate of each voxel is evaluated and the most dominant component is selected as the voxel type. A nearest neighbor analysis, such as evaluating the 6 first-order neighbors, can then be applied to each voxel to determine the tissue types of the voxel neighborhood in step 320. The mixture for the voxel is then assigned as the two predominant types in the neighborhood in step 325. For example, if three voxels of the first-order neighborhood where classified as air, two as bone/tagged materials and one was classified as muscle, the mixture for the voxel would be air and bone/TM. In the event that two tissue types are equally represented in the nearest neighbor analysis, the weights of the tissue types in the neighborhood voxels can be added and those components with the highest sum can be considered the predominant tissue types. For example, if two voxels were classified as air, two as muscle, and two voxels in the neighborhood classified as bone/TM, the values of air, muscle and bone/TM components in the mixtures of each voxel derived from the MAP-EM solution can be added to determine which are the two predominant tissue types in step 325. After the two predominant tissue types are identified in step 325, the PV image segmentation process returns to step 310 for another iteration of the MAP-EM solution. The process repeats until convergence of the MAP-EM solution is detected in step 310, as described above.

The PV image segmentation process described above is applicable to the case where each voxel can be resolved to a maximum of two material types per voxel (i.e., N=2 in step 325). However, the present method can be extended to mixtures of three or more material types per voxel (i.e., N=3 or more in step 325). Regardless of the number of material types, equations (8) and (9) of the MAP-EM solution described above are applicable. However, when a voxel is to be resolved to mixtures of three or more material types, equation (10) no longer provides a solution for mixture image segmentation and a new expression for the mixture parameter must be derived.

With three material types, for example, the conditional expectation can be expressed as:

$$Q_i \approx \frac{1}{2}\sum_k \left\{\frac{1}{(m_{ik}\sigma_k^2)^{(n)}}[-2\rho_i^{(n)}x_{ik}^{(n)}m_{ik}\mu_k^{(n)} + \rho_i^{2(n)}m_{ik}^2(\mu_k^{(n)})^2] + 2\beta\sum_{r\in N_i}\alpha_{ir}(\omega_{ik}^2 - 2m_{ik}m_{rk}^{(n)})^2\right\} = \tag{12}$$

$$\frac{1}{2}\sum_k\left\{m_{ik}^2\left(\frac{(\rho_i^{(n)}\mu_k^{(n)})^2}{(m_{ik}\sigma_k^2)^{(n)}} + 2\beta\sum_{r\in\varepsilon_i}\alpha_{ir}\right)\right\} -$$

$$\sum_k\left\{m_{ik}\left(\frac{\rho_i^{(n)}x_{ik}^{(n)}\mu_k^{(n)}}{(m_{ik}\sigma_k^2)^{(n)}} + 2\beta\sum_{r\in\varepsilon_i}\alpha_{ir}m_{rk}^{(n)}\right)\right\}$$

In matrix form, this be represented by:

$$Q_i \approx \frac{1}{2}(m_{i1}\ m_{i2}\ m_{i3})\begin{bmatrix}T_0 & T_1 & T_2 \\ T_3 & T_4 & T_5 \\ T_6 & T_7 & T_8\end{bmatrix}\begin{pmatrix}m_{i1}\\m_{i2}\\m_{i3}\end{pmatrix} - (b_0\ b_1\ b_2)\begin{pmatrix}m_{i1}\\m_{i2}\\m_{i3}\end{pmatrix}$$

where T is a diagonal matrix that may be represented by:

$$T = \begin{bmatrix}T_0 & 0 & 0\\0 & T_4 & 0\\0 & 0 & T_8\end{bmatrix} \text{ with}$$

$$T_0 = \frac{(\rho_i^{(n)}\mu_1^{(n)})^2}{(m_{i1}\sigma_1^2)^{(n)}} + 2\beta\sum_{r\in\varepsilon_i}\alpha_{ir},\ T_4 = \frac{(\rho_i^{(n)}\mu_2^{(n)})^2}{(m_{i2}\sigma_2^2)^{(n)}} + 2\beta\sum_{r\in\varepsilon_i}\alpha_{ir},$$

$$T_8 = \frac{(\rho_i^{(n)}\mu_3^{(n)})^2}{(m_{i3}\sigma_3^2)^{(n)}} + 2\beta\sum_{r\in\varepsilon_i}\alpha_{ir},\ b_0 = \frac{\rho_i^{(n)}x_{i1}^{(n)}\mu_1^{(n)}}{(m_{i1}\sigma_1^2)^{(n)}} + 2\beta\sum_{r\in\varepsilon_i}\alpha_{ir}m_{r1}^{(n)},$$

$$b_1 = \frac{\rho_i^{(n)}x_{i2}^{(n)}\mu_2^{(n)}}{(m_{i2}\sigma_2^2)^{(n)}} + 2\beta\sum_{r\in\varepsilon_i}\alpha_{ir}m_{r2}^{(n)},\ b_2 = \frac{\rho_i^{(n)}x_{i3}^{(n)}\mu_3^{(n)}}{(m_{i3}\sigma_3^2)^{(n)}} + 2\beta\sum_{r\in\varepsilon_i}\alpha_{ir}m_{r3}^{(n)}.$$

With the limitation set at a maximum three material types per voxel, the solution for the mixture parameter $\{m_{ik}\}$ becomes:

$$\begin{cases}m_{i1} + m_{i2} + m_{i3} = 1\\ m_{i1}(T_0 - T_1) + m_{i2}(T_3 - T_4) + m_{i3}(T_6 - T_7) = b_0 - b_1\\ m_{i1}(T_0 - T_2) + m_{i2}(T_3 - T_5) + m_{i3}(T_6 - T_8) = b_0 - b_2\end{cases} \tag{13}$$

The same derivation can be repeated to obtain similar equations for the solution of the mixture parameter $\{m_{ik}\}$ when the limitation is four or more material types per voxel.

Referring again to FIG. 1, after the iterative PV or mixture image segmentation of step 115 is completed, the voxels in the colon lumen may be classified as air, mixture of air with tissue, mixture of air with tagged materials, or mixture of tissue with tagged materials. Once the voxels are initially classified by mixture image segmentation, the present electronic colon cleansing (ECC) method applies this information to remove undesired components and to present a clean colon lumen and mucosa layer.

Figure 5A:
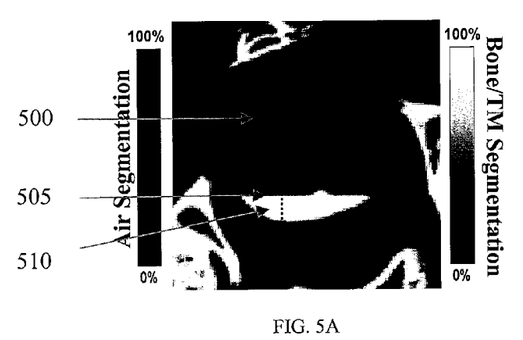
FIG. 5A is an exemplary CT image slice illustrating the mixture-based PV segmentation result from the corresponding image slice of FIG. 4A.
Figure 5B:
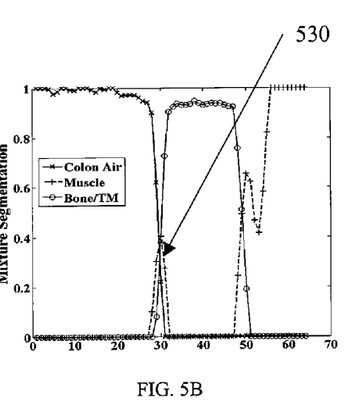
FIG. 5B is an exemplary graph that shows the corresponding mixture segmentation profiles for FIG. 5A for air, muscle and bone/tagged materials along the sample dotted vertical line which is the same as the line shown in FIG. 4A.

In most cases, PV image segmentation of FIG. 3 provides correct tissue/material mixtures within the interface and mucosa layers. In some cases, however, PV image segmentation may identify an incorrect mixture component in these layers. In step 120, voxels in the colon lumen may be reclassified to reduce such misclassification. FIG. 5B shows an example of such incorrectly segmented mixtures in voxels around location 30 along the vertical profile 530. The peak around location 30 along the vertical profile (the interface layer) indicates a misidentification of voxels 530. Around location 30, the graph indicates that the voxel contains a mixture of muscle material, colon air, and bone/TM. However, at the air/tagged materials interface layer, there is no possibility of muscle being present, therefore such a classification can be considered a misclassification.

In order to avoid such incorrect identifications, the present exemplary embodiment utilizes the well-known dilation-erosion strategy, such as described in "Digital Image Processing," Gonzalez et al., Addison-Wesley (1992), to reclassify potentially misclassified voxels. In the reclassification strategy of step 120, as implemented in the present exemplary embodiment, the colon air segmentation volume may be represented by $S^a$, which consists of the air component $\{m_{air}\}$ in the voxel array. Further, the tagged colonic material segmentation volume may be represented by $S^t$. For each volume, a 3D dilation operation may be applied by a three-cubic strel matrix:

$$D^a=\text{Dilation}(S^a,\text{strel}), D^t=\text{Dilation}(S^t,\text{strel}), \text{strel}=[1\ 1\ 1]^T \cdot [1\ 1\ 1]. \quad (14)$$

A new volume $S^e$ may be constructed by applying the erosion operation on the sum of $D^a$ and $D^t$, i.e., $S^e=\text{Erosion}((D^a+D^t),\text{strel})$. After the reclassification of the voxels, the voxels are classified correctly as air, a mixture of air/TM, or TM.

Figure 5C:
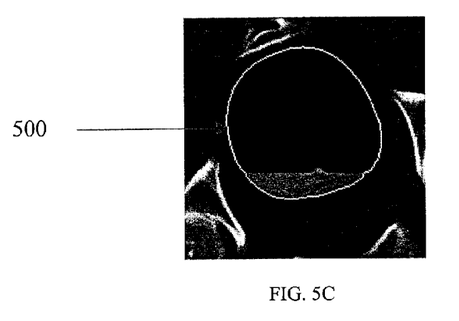
FIG. 5C is an exemplary CT image slice that illustrates the border of volume $S^e$ (the entire colon lumen enclosure) by a white line enclosing the entire colon lumen.
Figure 5D:
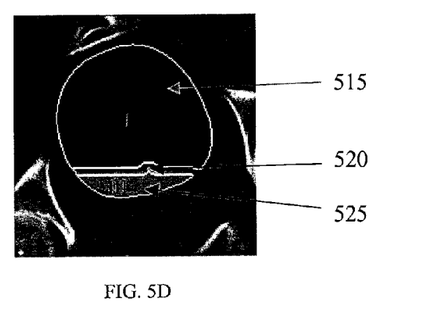
FIG. 5D is the exemplary CT image slice of FIG. 5C that further shows the regions in the enclosed volume of the colon lumen, which results from segmentation and grouping.

Step 125 may include grouping of like voxels in regions according to their mixture type. The grouping of voxels facilitates the subsequent steps of ECC by establishing the various regions in the acquired image according to the group. The new erosion volume $S^e$, established in step 120, covers the entire colonic space including the tagged material region and the interface layer, as shown by the enclosed white cylindrical boarder 535 in FIG. 5C. Based on the three volumes $D^a$, $D^t$, and $S^e$, the entire colonic space may be divided into three regions according to the following criteria $$P^m=\{\text{voxel}_i|S_i^e>0,D_i^a>0,D_i^t>0\}$$

$$P^a=\{\text{voxel}_i|\text{vowel}_i\notin P^m, S_i^e>0, S_i^a>0, S_i^t=0\}$$

$$P^t=\{\text{voxel}_i|\text{vowel}_i\notin P^m, S_i^e>S_i^e=0, S_i^t>0\} \quad (15)$$

where $P^a$ represents the colonic air space of region 1515 in FIG. 5D, $P^t$ reflects the tagged material region III 525 in FIG. 5D, and $P^m$ indicates the interface layer region II 520.

Figure 8:
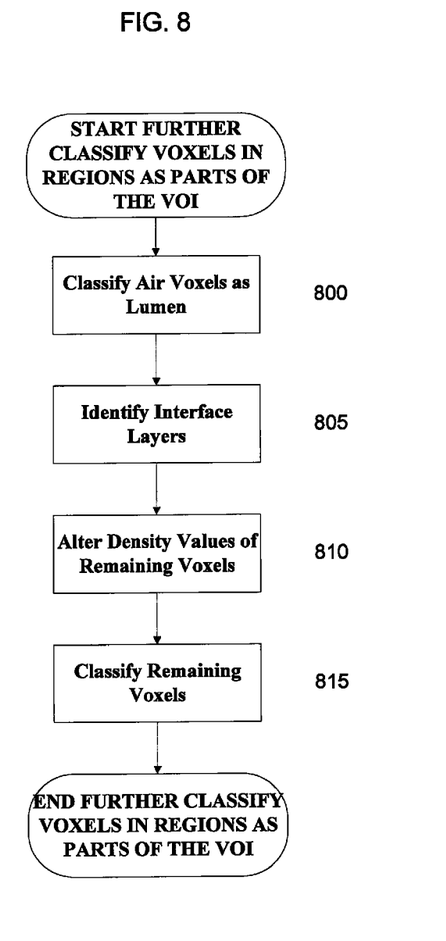
FIG. 8 is a simplified flow chart illustrating the steps of the exemplary process of further classifying the voxels as parts of the volume of interest after PV segmentation.

Step 130 may include further classifications of certain voxels as different parts of the volume of interest (VOI). Referring to FIG. 8, in the present exemplary embodiment, any voxels comprising the air space may be classified as part of the lumen in the VOI 800. In the present exemplary embodiment where the VOI is a colon, the open space would be the colon lumen. Following the air space classification, various interface layers can be identified 805. Interface layers may include zones at the border of different regions, which include voxels having a mixture of material types representative of the neighboring materials. In the present exemplary embodiment, where the VOI is a colon, there may be two interface layers. Referring to FIG. 4A, the first interface layer is an enhanced mucosa layer ("the mucosa layer") 415 consisting of a mixture of colon tissues and tagged materials, represented in FIG. 4C and FIG. 4D. The present ECC method identifies the enhanced mucosa layer and removes the portion with tagged colonic materials.

Figure 4B:
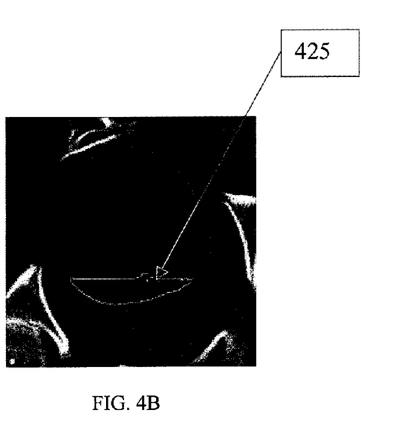
FIG. 4B is an exemplary CT image slice of the colon that has been partially cleansed, leaving an interface layer intact.
Figure 4C:
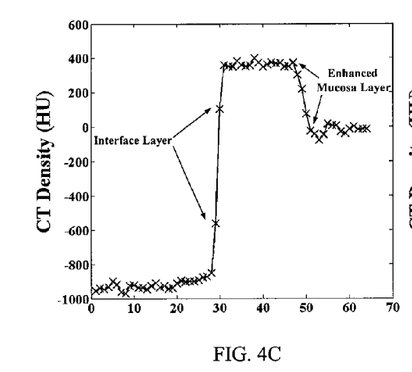
FIG. 4C is an exemplary graph that shows the corresponding density profile of the exemplary CT image slice along the vertical line, illustrated in FIG. 4A.
Figure 4D:
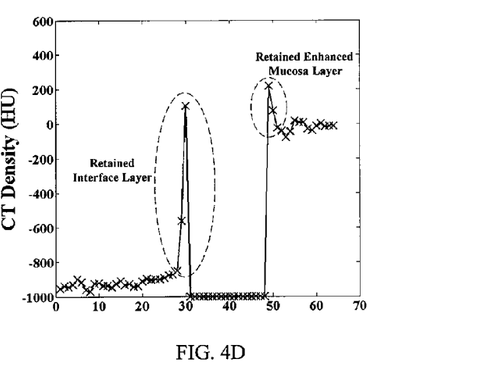
FIG. 4D is an exemplary graph that shows the corresponding density profile of the exemplary CT image slice in FIG. 4B, along the vertical line illustrated in FIG. 4A.

The second interface layer 405 in the present exemplary embodiment is the layer that can be presented between the air layer and the tagged materials layer as seen in FIG. 4A and FIG. 4C. Due to the PV effect and other potential errors such as from the scanner, patient motion, and image reconstruction procedure, the image density at the interface layer 405 may vary from the low end of about −900 HU, for air, to the high end of about 400 HU, for enhanced residues, as depicted in FIG. 4C. A simple threshold approach, as known in the art, can be applied to remove a substantial portion of tagged colonic materials. However, since the second interface layer 405 exhibits density values which overlap the range of colon tissues, it is difficult to distinguish the voxels of colonic materials in this layer from that of the colon tissues based on density value alone. As illustrated in FIG. 4B, applying a simple threshold, such as 200 HU, removes the majority of tagged colonic materials, but an interface layer 425 is retained.

Referring to FIG. 5D, three regions may be identified as parts of the colon or colon lumen. Region I consists entirely of the colonic air space and, as stated above, may be classified as the colon lumen in step 800. However, before voxels in regions II and III may be classified as part of the colon, their image density values $I_i^{new}$ may be altered by a density altering function in step 810:

$$I_i^{new} = \begin{cases} I_i^{original} + (\mu_1 - \mu_4) \cdot m_{i4} + \\ \quad (\bar{I}_i - I_i^{original}) \cdot m_{i4} & \text{if } \bar{I}_i \geq I_i^{original} \\ I_i^{original} + (\mu_1 - \mu_4) \cdot \\ \quad \left(m_{i4} + \frac{(I_i^{original} - \bar{I}_i) \cdot m_{i4}}{\mu_4}\right) & \text{if } \bar{I}_i < I_i^{original} \end{cases} \quad (16)$$

where $$\bar{I}_i = \sum_{k=1}^{4} m_{ik}\mu_k,$$

and $\mu_k$ and $m_{ik}$ have been defined before as the mean parameter of material type k in the image and the fraction of material type k in voxel i respectively In equation (16), index 1 refers to the segmentation of colonic air and index 4 refers to the segmentation of the bone/TM.

Figure 6A:
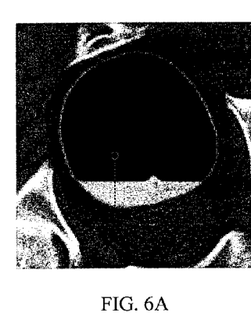
FIG. 6A is an exemplary CT image slice (originally shown in FIG. 4A)
Figure 6B:
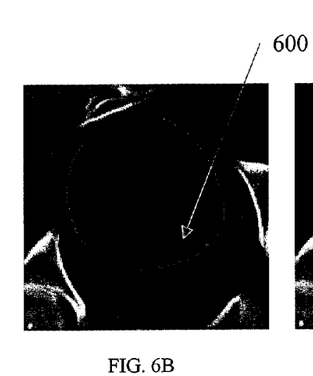
FIG. 6B is the CT image slice of FIG. 6A further showing the cleansed CT image after altering the density values and in which all the tagged colonic materials are removed.
Figure 6C:
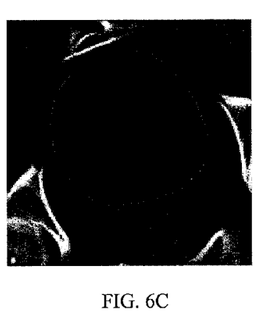
FIG. 6C is the CT image slice of FIG. 6A that further illustrates the final cleansed CT image having a fully restored mucosa layer and a cleansed colon lumen.
Figure 6D:
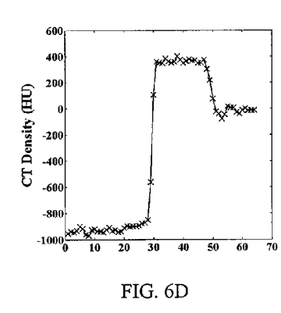
FIG. 6D is an exemplary graph that shows the corresponding density profile of the CT image slice along the vertical line in FIG. 6A.
Figure 6E:
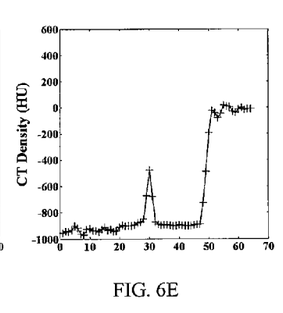
FIG. 6E is a graph that shows the corresponding density profile of the CT image slice in FIG. 6B along the vertical line shown in FIG. 6A.

Using equation (16), the image density values of the voxels in regions II and III are altered. The voxels with altered density values may then be classified in step 815. In region III, the altered image density values of those voxels containing mixtures of colon tissues and tagged materials are restored to form the mucosa layer, and other voxels are classified as colon lumen voxels. In region II, the voxels on each side (or at each boundary) of the interface layer are altered by equation (16), but may not be completely restored due to the presence of more than two tissue types in some voxels. Referring to FIGS. 6B and 6E, some small spots may be retained along the horizontal direction in region II 600 after processing by equation (16).

Figure 6F:
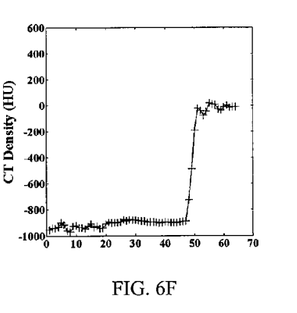
FIG. 6F is a graph that shows the corresponding density profile of the CT image slice in FIG. 6C along the vertical line shown in FIG. 6A.

To eliminate this patch-like effect, the present exemplary embodiment introduces an equation to restore the image density for each voxel in region II. First, a subtraction volume SUB may be defined, which is generated by iteration:

$$SUB_i^{(0)} = I_i^{new} \quad (17)$$

$$SUB_i^{(n)} = SUB_i^{(n-1)} + \sum_{n \in neighbor(i)} \frac{e^{-(\nabla_n SUB^{(n-1)})^2}}{\|\nabla_n SUB^{(n-1)}\|}$$

where $\nabla$ represents the first-order derivative at the given position and the neighborhood of this voxel includes that voxel itself. In the present exemplary embodiment, after three iterations of equation (17), the image density at the interface layer may be further adjusted by $I_i^{newII} = I_i^{new} - SUB_i$, $i \in$ interface layer. The image density values in the interface layer may then be reduced to a reasonable level $I_i^{newII}$ toward that of air level. Those voxels which exhibit modified density values, having a value close to that of air, are then classified as the colon lumen space in step 835. These operations remove the patch-like effect and improve the image density restoration at both ends of region II, as shown in FIG. 6C and FIG. 6F.

The converted air voxels in regions I, II, and III make up the colon lumen space, from which a virtual colon model may be constructed for VC examination. Within the colon lumen space, a centerline or fly-path may be determined and a potential field may be constructed to facilitate the VC navigation through the entire lumen space to facilitate looking for polyps, as known in the art. The geometric information of the lumen border can be analyzed by a surface-based CAD technique to detect the polyps, as known in the art. The restored image density values of the mucosa layer, which may be comprised of five to ten voxels beyond the lumen border, can be extracted for texture analysis for improved CAD performance, according to the art.

What is claimed is:

1. A method for electronically cleansing a virtual object, formed from acquired image data converted to a plurality of volume elements, each volume element having an intensity value, comprising:
    defining a partial volume image model for volume elements representing a plurality of material types based on the intensity value of the volume element;
    estimating a material mixture for volume elements representing a plurality of material types using the observed intensity values and the defined partial volume image model;
    classifying the volume elements representing a plurality of material types in accordance with the estimated material mixture;
    evaluating the volume elements in at least one classification;
    reclassifying incorrectly classified volume elements;
    grouping volume elements according to their material or material mixture into different regions;
    assigning the volume elements in each region as different parts of the virtual object; and
    removing at least one classification of volume elements when displaying the virtual object.

2. The method in accordance with claim 1, wherein the step of estimating a material mixture further comprises an iterative application of a maximum a posteriori probability-expectation maximization estimation.

3. The method for electronically cleansing a virtual object according to claim 2, wherein the material mixture is constrained to at most two different material types.

4. The method for electronically cleansing a virtual object according to claim 3, further comprising constraining the mixture of each voxel to two predominant material types in the first order neighborhood around the voxel.

5. The method for electronically cleansing a virtual object according to claim 2, wherein the step of estimating a material mixture further comprises adjustment for the inhomogeneity effect in the acquired image data.

6. The method in accordance with claim 1, wherein the partial volume image model comprises a probability distribution of mixture parameters.

7. The method for electronically cleansing a virtual object according to claim 2, wherein the material mixture is comprised of three different material types.

8. The method for electronically cleansing a virtual object according to claim 1, wherein the reclassification operation comprises a dilation-erosion operation.

9. The method for electronically cleansing a virtual object according to claim 1, wherein the classifying operation further comprises:
    identifying at least one interface region;
    altering the intensity values of the volume elements in the at least one interface region;
    identifying altered intensity volume elements of a material type classification to be removed; and
    restoring the intensity values of the altered intensity volume elements for at least one material type not to be removed.

10. The method for electronically cleansing a virtual object according to claim 9, wherein one of the at least one interface regions is a mucosa layer in a colon.

11. The method for electronically cleansing a virtual object according to claim 10, wherein the removing operation removes volume elements representing at least one of intracolonic fluid, residual stool within the colon, bone, and non-colonic tissue.

12. The method for electronically cleansing a virtual object according to claim 10, wherein the removing operation further comprises cleansing of a colon lumen.

13. The method for electronically cleansing a virtual object according to claim 10, wherein the removing operation further comprises extraction of a colon mucosa layer.

14. The method for electronically cleansing a virtual object according to claim 9, wherein one of the at least one interface regions comprising at least two volume elements, each volume element classified as having multiple material types.

15. The method for electronically cleansing a virtual object according to claim 1, wherein the image data represents a region of the human body including at least a portion of the colon.

16. The method for electronically cleansing a virtual object according to claim 1, wherein the step of estimating a material mixture further comprises an iterative application of a partial volume segmentation algorithm.

17. The method for electronically cleansing a virtual object according to claim 16, wherein the partial volume segmentation algorithm comprises a maximum a posteriori probability-expectation maximization algorithm.

* * * * *